(12) United States Patent
Kim et al.

(10) Patent No.: US 10,183,544 B2
(45) Date of Patent: Jan. 22, 2019

(54) HEAT PUMP SYSTEM FOR VEHICLE

(71) Applicant: HYUNDAI MOTOR COMPANY, Seoul (KR)

(72) Inventors: Jae Yeon Kim, Hwaseong-si (KR); Jai Young An, Yeongtong-gu (KR); Myunghwan Kim, Hwaseong-si (KR); Wan Je Cho, Hwaseong-si (KR); Yeon Ho Kim, Seoul (KR); Yong Hyun Choi, Hwaseong-si (KR); Tae Han Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 169 days.

(21) Appl. No.: 15/369,423

(22) Filed: Dec. 5, 2016

(65) Prior Publication Data

US 2018/0117985 A1 May 3, 2018

(30) Foreign Application Priority Data

Oct. 31, 2016 (KR) ........................ 10-2016-0143463

(51) Int. Cl.
*B60H 1/00* (2006.01)
*B60H 3/00* (2006.01)
(Continued)

(52) U.S. Cl.
CPC ..... *B60H 1/00278* (2013.01); *B60H 1/00385* (2013.01); *B60H 1/00921* (2013.01);
(Continued)

(58) Field of Classification Search
CPC ................... F25B 25/005; F25B 30/02; B60H 2001/00928; B60H 1/00278; B60H 1/00385
(Continued)

(56) References Cited

U.S. PATENT DOCUMENTS 6,357,541 B1 3/2002 Matsuda et al.
6,705,101 B2 3/2004 Brotz et al.
(Continued)

FOREIGN PATENT DOCUMENTS

DE 102014217960 A1 * 3/2016 ......... B60H 1/00278
JP 2002-352866 A 12/2002
(Continued)

OTHER PUBLICATIONS

WO 2018012818 A1 English Machine Translation—Retrieved Jul. 2018.*

*Primary Examiner* — Len Tran
*Assistant Examiner* — Jenna M Hopkins
(74) *Attorney, Agent, or Firm* — McDonnell Boehnen Hulbert & Berghoff LLP (57) ABSTRACT

Disclosed herein is a heat pump system for a vehicle having a battery module and an electric module. The heat pump system includes: a first cooling line connected to the battery module and having a coolant flowing therein; a chiller disposed on the first cooling line and connected to a refrigerant line of an air conditioning system through a connection line, and exchanging heat between a coolant selectively introduced therein and a refrigerant to control a temperature of the coolant; a cooling system including a radiator connected to a cooling line and a first pump circulating the coolant along the second cooling line so as to cool an electric module, and connected to the first cooling line through a first valve; and a bypass line selectively connecting the connection line and the refrigerant line to each other through a second valve provided on the refrigerant line.

17 Claims, 7 Drawing Sheets

(51) Int. Cl.
*F25B 25/00* (2006.01)
*F25B 30/02* (2006.01)
*B60H 3/02* (2006.01)
*B60H 1/22* (2006.01)

(52) U.S. Cl.
CPC .......... *B60H 3/024* (2013.01); *F25B 25/005* (2013.01); *F25B 30/02* (2013.01); *B60H 1/2225* (2013.01); *B60H 2001/00307* (2013.01); *B60H 2001/00928* (2013.01)

(58) Field of Classification Search
USPC ........................................ 62/324.1
See application file for complete search history.

(56) References Cited

U.S. PATENT DOCUMENTS

| | | | |
|---|---|---|---|
| 7,147,071 B2 | 12/2006 | Gering | |
| 7,797,954 B2 | 9/2010 | Duhme et al. | |
| 7,890,218 B2 | 2/2011 | Adams et al. | |
| 7,975,757 B2 | 7/2011 | Nemesh et al. | |
| 8,215,432 B2 | 7/2012 | Nemesh et al. | |
| 8,402,776 B2 | 3/2013 | Johnston et al. | |
| 9,855,815 B2* | 1/2018 | Saab | B60H 1/00278 |
| 10,118,458 B2* | 11/2018 | Kim | B60H 1/00278 |
| 2013/0074525 A1 | 3/2013 | Johnston et al. | |
| 2013/0118707 A1 | 5/2013 | Kardos et al. | |
| 2013/0227973 A1* | 9/2013 | Kang | F25B 47/022 |
| | | | 62/80 |
| 2014/0033761 A1 | 2/2014 | Kawakami et al. | |
| 2014/0060102 A1 | 3/2014 | Nemesh et al. | |
| 2014/0069123 A1* | 3/2014 | Kim | F25B 5/04 |
| | | | 62/61 |
| 2014/0208789 A1* | 7/2014 | Lombardo | B60H 1/00007 |
| | | | 62/238.6 |
| 2014/0216689 A1 | 8/2014 | Lombardo et al. | |
| 2015/0217625 A1* | 8/2015 | Kang | B60H 1/00899 |
| | | | 62/160 |
| 2015/0266354 A1* | 9/2015 | Blackburn | B60H 1/00271 |
| | | | 454/152 |
| 2016/0018153 A1* | 1/2016 | Ragazzi | F25B 30/02 |
| | | | 62/324.1 |
| 2016/0107508 A1* | 4/2016 | Johnston | B60H 1/00278 |
| | | | 165/202 |
| 2017/0008407 A1* | 1/2017 | Porras | B60L 11/187 |
| 2017/0267063 A1* | 9/2017 | Shan | B60H 1/00921 |
| 2017/0274727 A1* | 9/2017 | Tasiopoulos | B60H 1/00271 |
| 2018/0022184 A1* | 1/2018 | Ohyama | B60L 1/003 |
| | | | 62/231 |
| 2018/0050605 A1* | 2/2018 | Lewis | H02P 29/68 |
| 2018/0117986 A1* | 5/2018 | Kim | H01M 10/663 |
| 2018/0117990 A1* | 5/2018 | Kim | B60H 1/00278 |
| 2018/0163610 A1* | 6/2018 | Cha | F01P 11/0238 |

FOREIGN PATENT DOCUMENTS

| | | | | |
|---|---|---|---|---|
| JP | 2010-114063 A | 5/2010 | | |
| JP | 5336033 B2 | 11/2013 | | |
| JP | 5440426 B2 | 3/2014 | | |
| JP | 2015-186989 A | 10/2015 | | |
| KR | 10-2011-0138514 A | 12/2011 | | |
| KR | 10-1198816 B1 | 11/2012 | | |
| KR | 2015-0093590 A | 8/2015 | | |
| WO | WO2012-013583 A1 | 2/2012 | | |
| WO | WO 2013124173 A1 * | 8/2013 | ......... | B60H 1/00278 |
| WO | WO 2014154326 A1 * | 10/2014 | ......... | B60H 1/00899 |
| WO | WO 2015098049 A1 * | 7/2015 | ......... | B60H 1/00885 |
| WO | WO 2015194107 A1 * | 12/2015 | ................ | F25B 1/00 |
| WO | WO 2018012818 A1 * | 1/2018 | | |

* cited by examiner

HEAT PUMP SYSTEM FOR VEHICLE

CROSS-REFERENCE TO RELATED APPLICATION

This application claims priority to and the benefit of Korean Patent Application No. 10-2016-0143463 filed in the Korean Intellectual Property Office on Oct. 31, 2016, the entire contents of which are incorporated herein by reference.

BACKGROUND

(a) Technical Field

The present invention relates to a heat pump system for a vehicle. More particularly, the present invention relates to a heat pump system for a vehicle capable of cooling a battery module using a chiller in which a refrigerant and a coolant exchange heat with each other and improving heating efficiency using another chiller recovering waste heat of an electric module and the battery module.

(b) Description of the Related Art

Generally, a vehicle air conditioner includes an air conditioning system circulating a refrigerant in order to heat or cool an interior of the vehicle.

The air conditioning system, which is used to maintain the interior of the vehicle at a desired temperature regardless of a change in an external temperature to maintain a comfortable interior environment, is configured to heat or cool the interior of the vehicle through heat exchange in an evaporator. In this process, a refrigerant is circulated to a compressor through a condenser, a receiver drier, an expansion valve, and the evaporator.

The air conditioning system uses a condenser to lower the temperature and the humidity of the interior of the vehicle by condensing a high-temperature, high-pressure gas-phase refrigerant compressed by the compressor, passing the refrigerant through the receiver drier and the expansion valve, and then evaporating the refrigerant in the evaporator in a cooling mode in summer.

Recently, due to a continuously increasing interest in energy efficiency and environmental protection, there has been significant demand for development of an environmentally-friendly vehicle capable of substituting for an fossil-fuel burning internal combustion engine vehicle. Environmentally-friendly vehicles may generally be classified into electric vehicles driven using a fuel cell or electricity as a power source and hybrid vehicles driven using an engine and a battery.

In the electric vehicle or the hybrid vehicle, a separate heater is not used, and the air conditioner used in the environmentally-friendly vehicle is generally called a heat pump system.

The electric vehicle generates driving force by converting chemical reaction energy between oxygen and hydrogen into electric energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to ensure performance of the motor.

In the hybrid vehicle or the electric vehicle according to the related art, a cooling system, a heat pump system, and a battery cooling system are configured using separate closed circuits, respectively, so as to prevent heat generation of the motor, an electric module, and the battery including the fuel cells.

Therefore, the size and weight of a cooling module disposed at the front of the vehicle are increased, and the layout of connection pipes supplying a refrigerant or a coolant to each of the heat pump system, the cooling system, and the battery cooling system in an engine compartment becomes complicated.

In addition, because the battery cooling system that heats or cools the battery depending on a state of the vehicle is separately provided so that the battery exhibits optimal performance, a plurality of valves for connecting the respective connection pipes to each other are used, and noise and vibrations due to frequent opening or closing of these valves are transferred to the interior of the vehicle, resulting deterioration of ride comfort.

The above information disclosed in this Background section is only for enhancement of understanding of the background of the invention and therefore it may contain information that does not form the prior art that is already known in this country to a person of ordinary skill in the art.

SUMMARY

The present disclosure addresses the problems described above by providing a heat pump system for a vehicle having the advantages of being simplified by cooling a battery module using one chiller in which a coolant and a refrigerant exchange heat with each other.

Further, the present disclosure provides a heat pump system for a vehicle having the advantage of improving heating efficiency using another chiller that recovers waste heat from an electric module and a battery module.

An example embodiment according to the present disclosure provides a heat pump system for a vehicle, comprising: a first cooling line connected to the battery module and having a first coolant flowing therein; a cooling system comprising a radiator connected to a second cooling line and a first pump, wherein the first pump is connected to the first cooling line through a first valve; a first chiller disposed on the first cooling line, connected to a refrigerant line of an air conditioning system through a first connection line; and a second chiller connected to the first cooling line and connected to a second connection line through a second valve disposed on the refrigerant line, wherein the cooling system circulates the coolant along the second cooling line in order to cool the electric module; the first chiller exchanges heat between a second coolant selectively introduced thereinto and a refrigerant to control a temperature of the coolant; and the second chiller recovers waste heat from a third coolant selectively introduced thereinto to raise a temperature of the refrigerant by exchanging heat between the coolant and the refrigerant.

The air conditioning system may include: a heating, ventilation, and air conditioning (HVAC) module connected through the refrigerant line and including a door controlling external air passing through an evaporator to be selectively introduced into an internal condenser and an internal heater depending on whether the vehicle is in a cooling mode, a heating mode, or a heating and dehumidifying mode; a compressor connected between the evaporator and the internal condenser through the refrigerant line; an accumulator provided on the refrigerant line between the compressor and the evaporator; an external condenser connected to the internal condenser through the refrigerant line and disposed at a front of the vehicle; a first expansion valve provided on the refrigerant line connecting the external condenser and the evaporator to each other; a dehumidifying line having one end connected to the refrigerant line between the internal condenser and the external condenser and the other end connected to the refrigerant line between the evaporator and the first expansion valve and including a third valve; a defrosting valve connected to the refrigerant line between the external condenser and the first expansion valve through a fourth valve provided on the refrigerant line between the internal condenser and the external condenser; and a second expansion valve provided on the first connection line.

The second expansion valve may be operated when cooling the battery module using the refrigerant to expand the refrigerant introduced through the first connection line and introduce the expanded refrigerant into the first chiller.

The first valve may connect the second cooling line connected to the electric module and the first cooling line to each other between the radiator and the first chiller. A first branch line connecting the first chiller to the battery module through the first valve may be disposed on the first cooling line, a fifth valve selectively connecting the second cooling line to the first cooling line between the radiator and the battery module may be disposed on the second cooling line, and a second branch line connecting the radiator to the electric module through the fifth valve may be disposed on the second cooling line connecting the electric module to the first valve.

The first valve and the fifth valve may connect the second cooling line to the first cooling line and close the first and second branch lines, when cooling the battery module using a coolant cooled in the radiator.

When raising a temperature of the battery module or when cooling the battery module using the coolant exchanging heat with the refrigerant, the first valve may open the first branch line and close the connection between the second cooling line and the first cooling line, and the fifth valve may close the connection between the second cooling line and the first cooling line simultaneously with closing the second branch line.

When cooling the battery module while the vehicle is in a cooling mode, the dehumidifying line and the defrosting line may be closed by operation of the third valve and the fourth valve.

When cooling the battery module using the refrigerant while the vehicle cooling mode not operated, the dehumidifying line and the defrosting line may be closed by operation of the third valve and the fourth valve, operation of the first expansion valve may be stopped, and the second expansion valve may be operated.

A reservoir tank may be disposed on the second cooling line between the radiator and the fifth valve. The reservoir tank may be connected to a third branch line through a sixth valve disposed on the second cooling line between the radiator and the electric module and to the first branch line through a degassing line.

The second chiller may be disposed on the third branch line and may be selectively connected to the second cooling line depending on operation of the sixth valve, and the second connection line may be connected to the first connection line.

When recovering waste heat of the battery module and the electric module while the vehicle is in a heating mode, the first cooling line and the second cooling line may be connected to each other and the first branch line and the second branch line may be closed, by operation of the first valve and the fifth valve; the refrigerant line connected to the evaporator may be closed and the second connection line may be opened, by operation of the second valve; the dehumidifying line and the defrosting line may be closed by operation of the third valve and the fourth valve; the third branch line may be opened while the second cooling line connected to the radiator is closed, by operation of the sixth valve; and operation of the first and second expansion valves may be stopped.

When recovering waste heat from the battery module and the electric module while the vehicle is in a heating and dehumidifying mode, the first cooling line and the second cooling line may be connected to each other and the first branch line and the second branch line may be closed, by operation of the first valve and the fifth valve; the refrigerant line connected to the evaporator may be closed and the second connection line may be opened, by operation of the second valve; the dehumidifying line may be opened by operation of the third valve; the defrosting line may be closed by operation of the fourth valve; the third branch line may be opened while the second cooling line connected to the radiator is closed, by operation of the sixth valve; and operation of the first and second expansion valves may be stopped.

When recovering waste heat from the battery module and the electric module while the vehicle is in a heating and defrosting mode, the first cooling line and the second cooling line may be connected to each other and the first branch line and the second branch line may be closed, by operation of the first valve and the fifth valve; the refrigerant line connected to the evaporator may be closed and the second connection line may be opened, by operation of the second valve; the dehumidifying line may be closed by operation of the third valve; the defrosting line may be opened by operation of fourth valve; the refrigerant line connected to the external condenser may be closed by operation of the fourth valve; the third branch line may be opened while the second cooling line connected to the radiator is closed, by operation of sixth valve; and operation of the first and second expansion valves may be stopped.

The degassing line may exhaust bubbles generated in a coolant passing through the first branch line to the reservoir tank or introduce bubbles generated and collected from a coolant circulated along the second cooling line into the first branch line to maintain a pressure balance between the second cooling line and the first cooling line.

The degassing line may introduce some of bubbles included in a coolant passing through the first branch line into the reservoir tank to prevent generation of a pressure differential between the second cooling line and the first branch line, when cooling the battery module using the coolant exchanging heat with the refrigerant, while the coolant is not circulated along the second cooling line.

The first, second, fourth, fifth and sixth valves may be 3-way valves that distribute a flow rate.

An orifice may be disposed on the refrigerant line between the internal condenser and the fourth valve, and the orifice may selectively open or close the refrigerant line or selectively expand a refrigerant passing through it.

The dehumidifying line may be connected to the refrigerant line between the fourth valve and the orifice.

A second pump may be disposed on the first cooling line between the first chiller and the battery module.

A heater may be disposed on the first cooling line between the battery module and the first chiller, and the heater may be activated when raising a temperature of the battery module to heat the coolant circulated along the first cooling line and introduce the heated coolant into the battery module, and may be selectively activated when the vehicle is in a heating mode or a heating and defrosting mode to heat the coolant circulated along the first cooling line.

As described above, according to an example embodiment of a heat pump system for a vehicle, the temperature of the battery module may be raised or lowered depending on the mode of an electric vehicle or a hybrid vehicle using one chiller in which a coolant and a refrigerant exchange heat with each other, thereby making it possible to simplify the heat pump system for a vehicle.

In addition, the temperature of the battery module is efficiently raised and lowered depending on the mode of the vehicle, such that the battery module exhibits optimal performance, and the maximum travel distance of the vehicle is increased through efficient management of the battery module.

In addition, the example heat pump system for a vehicle according to the present disclosure may improve heating efficiency using another chiller selectively recovering waste heat from the electric module and the battery module.

Further, the entire heat pump system for a vehicle is simplified, thereby making it possible to reduce manufacturing costs for the heat pump system for a vehicle, reduce the weight of the heat pump system for a vehicle and improve space utilization.

DESCRIPTION OF SYMBOLS

10: cooling system
11: cooling line
12: radiator
13: cooling fan
14: first pump
15: electric module
16: reservoir tank
20: air conditioning system
21: refrigerant line
22: HVAC module
23: internal condenser
25: internal heater
27: evaporator
29: opening or closing door
31: compressor
33: accumulator
35: external condenser
37: first expansion valve
39: orifice
41: dehumidifying line
43: defrosting line
45: second expansion valve
100: heat pump system
101: first cooling line
103: second pump
110: first chiller
111: first connection line
113: second chiller
115: second connection line
120, 130, 140: first, second and third branch lines
150: degassing line
B: battery module
V1, V2, V3, V4, V5, V6: first, second, third, fourth, fifth and sixth valves

DETAILED DESCRIPTION OF THE EMBODIMENTS

Example embodiments of a heat pump system for a vehicle according to the present disclosure are hereinafter described in detail with reference to the accompanying drawings.

Because example embodiments described in the present specification and configurations shown in the accompanying drawings are only examples and do not limit the spirit of the present invention. Therefore, it is to be understood that various equivalents and modifications that may replace example embodiments described in the present specification and configurations shown in the accompanying drawings in a point in time at which the present invention is filed.

A detailed description of technology not associated with the present invention will be omitted in order to clearly describe the present invention. Like reference numerals designate like elements throughout the specification.

Because sizes and thicknesses of the respective components are arbitrarily shown in the accompanying drawings for convenience of explanation, the present disclosure is not limited to contents shown in the accompanying drawings. In addition, thicknesses may be exaggerated in order to emphasize various portions and regions.

In addition, throughout the present specification, unless explicitly described to the contrary, the word "comprise" and variations such as "comprises" or "comprising", will be understood to imply the inclusion of stated elements but not the exclusion of any other elements.

In addition, the terms "~unit", "~means", "~part", "member", and the like, described in the specification mean units of a comprehensive configuration for performing at least one function or operation.

Figure 1:
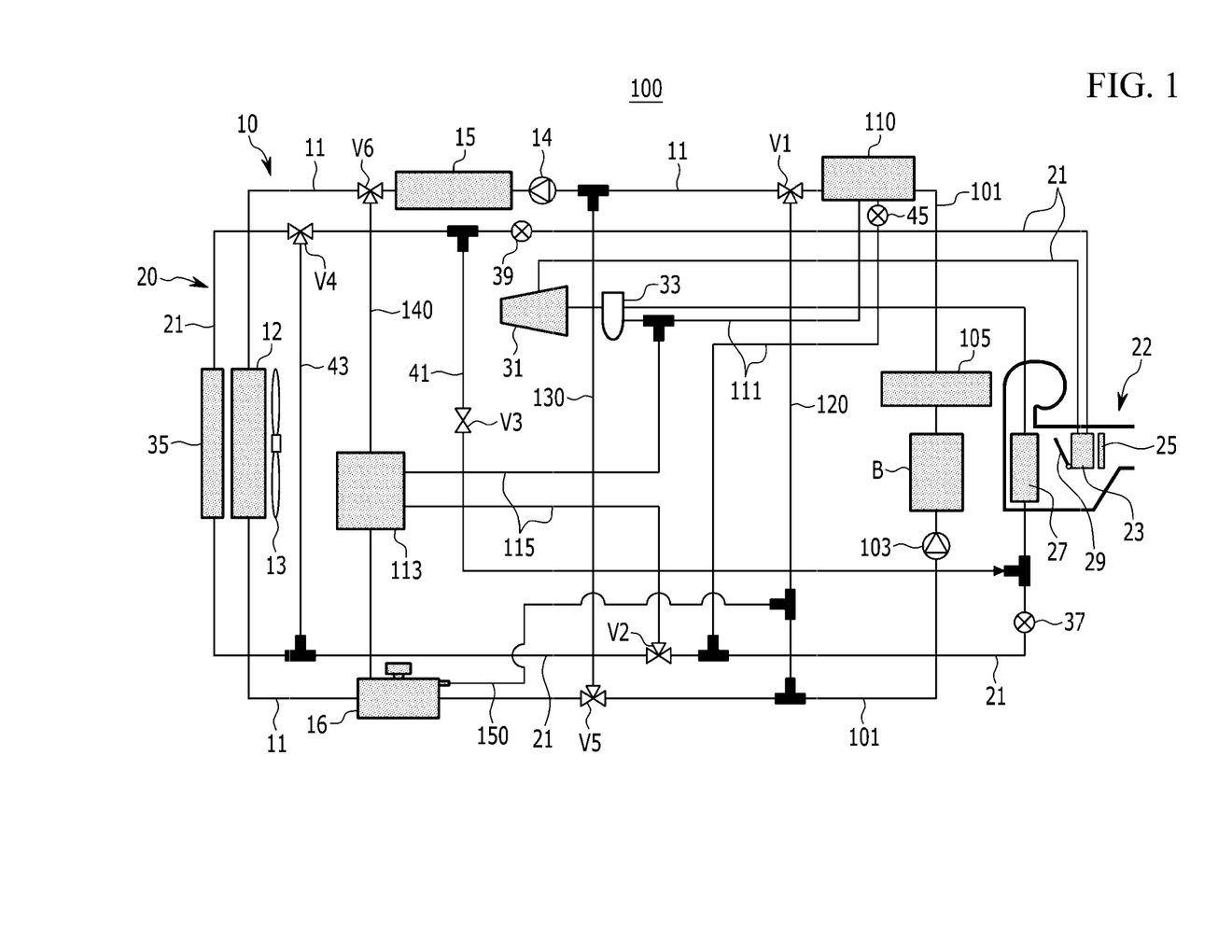
FIG. 1 is a block diagram of an example embodiment of a heat pump system for a vehicle.

FIG. 1 is a block diagram of an example embodiment of a heat pump system for a vehicle.

The heat pump system 100 for a vehicle raises a temperature of a battery module B mounted in the vehicle; cools battery module B; or selectively uses waste heat generated by battery module B or an electric module 15 to improve heating efficiency.

As shown in FIG. 1, example heat pump system 100 for a vehicle works together with a cooling system 10 for cooling electric module 15 and an air conditioning system 20, which is an air conditioner for cooling or heating an interior of a hybrid vehicle or an electric vehicle.

Cooling system 10 includes a radiator 12 connected to cooling lines 11 and a first pump 14, and circulates a coolant to cool electric module 15.

In an example embodiment, electric module 15 may include a motor, an electric power control unit, an on-board charger, and the like.

Radiator 12 is disposed at the front of the vehicle, and a cooling fan 13 is disposed at one side of radiator 12. The coolant is cooled through operation of cooling fan 13 and heat-exchange with external air.

Electric module 15 may be positioned in series on second cooling line 11 between radiator 12 and first pump 14.

Cooling system 10 configured as described above circulates the coolant cooled in radiator 12 along cooling lines 11 through operation of first pump 14 to cool electric module 15 and prevent it from becoming overheated.

In an example embodiment, air conditioning system 20 includes a heating, ventilation, and air conditioning ("HVAC") module 22, a compressor 31, an accumulator 33, an external condenser 35, and a first expansion valve 37 connected to one another through refrigerant lines 21.

HVAC module 22 is connected through the refrigerant line 21 and has a door 29 adjusting the flow of ambient air that has passed through an evaporator 27, to be selectively introduced to an internal condenser 23 and a heater 25 according to a cooling, heating, and heating/dehumidification mode of the vehicle.

In the heating mode of the vehicle, door 29 is opened so that the external air passing through the evaporator 27 is introduced into internal condenser 23 and internal heater 25. In contrast, in the cooling mode of the vehicle, door 29 closes so that the external air cooled while passing through evaporator 27 is directly introduced into the interior of the vehicle.

Compressor 31 is connected between evaporator 27 and internal condenser 23 through refrigerant lines 21. Compressor 31 compresses a gaseous refrigerant.

Accumulator 33 is disposed on refrigerant line 21 between compressor 31 and evaporator 27. Accumulator 33 supplies the gaseous refrigerant to compressor 31 to improve efficiency and durability of the compressor 31.

In the present example embodiment, external condenser 35 is connected to internal condenser 27 through refrigerant line 21. External condenser 35 is disposed at a side of radiator 12 opposite the side where cooling fan 13 is disposed, and exchanges heat between external air and a refrigerant introduced into the interior of the condenser.

First expansion valve 37 is disposed on refrigerant line 21 between external condenser 35 and evaporator 27. First expansion valve 37 receives and expands the refrigerant passing through external condenser 35.

The example heat pump system 100 for a vehicle further includes first cooling lines 101, a first chiller 110, and a second chiller 113.

First cooling lines 101 are connected to the battery module B, and have a coolant flowing therein. Battery module B supplies power to electric module 15. Battery module B may be a liquid-cooled battery module cooled using the coolant.

Battery module B is connected to cooling system 10 through first cooling lines 101, and the coolant may be circulated in battery module B through operation of a second pump 103.

The second pump 103 is disposed on first cooling line 101 between first chiller 110 and battery module B. Second pump 103 circulates the coolant through first cooling lines 101.

In an example embodiment, the first pump 14 and the second pump 103 may be electric pumps.

First chiller 110 is disposed on first cooling line 101, and is connected to refrigerant lines 21 through first connection lines 111. First chiller 110 selectively exchanges heat between a refrigerant and the coolant to control the temperature of the coolant.

Meanwhile, in the present example embodiment, a heater 105 may be disposed on first cooling line 101 between battery module B and first chiller 110. When it is necessary to raise the temperature of battery module B, heater 105 is activated to heat the coolant circulated along first cooling lines 101. The heated coolant is then introduced into battery module B by circulation through first cooling lines 101.

Heater 105 also may be selectively activated when the vehicle is in a heating mode or a heating and defrosting mode to heat the coolant circulated along first cooling lines 101.

Cooling system 10 is selectively connected to first cooling line 101 through a first valve V1. First valve V1 may connect second cooling line 11 connected to electric module 15 to first cooling line 101 between the radiator 12 and the first chiller 110.

A first branch line 120 connects the respective first cooling lines 101 to each other between first chiller 110 and battery module B through first valve V1.

First valve V1 selectively connects second cooling line 11 to first cooling line 101 or selectively connects first cooling line 101 to first branch line 120 to control the flow of the coolant.

For example, first valve V1 may connect second cooling line 11 to first cooling line 101 and close first branch line 120, when cooling battery module B using the coolant cooled in radiator 12.

In addition, first valve V1 may open first branch line 120 and close the connection between second cooling line 11 and first cooling line 101, when raising the temperature of battery module B or when cooling battery module B using the coolant exchanging heat with the refrigerant.

In this configuration, a low-temperature coolant which exchanges heat with the refrigerant in first chiller 110 is introduced into battery module B through first branch line 120 opened by first valve V1, thereby making it possible to efficiently cool battery module B.

In contrast, when raising the temperature of battery module B, first valve V1 operates to prevent the coolant circulated along first cooling lines 101 from being introduced into radiator 12, thereby making it possible to introduce the coolant heated by heater 105 into battery module B to rapidly raise the temperature of battery module B.

In the present example embodiment, second chiller 113 is connected to second cooling line 11 and to a second connection line 115 through a second valve V2 disposed on refrigerant line 21.

Second chiller 113 may be heated by heat generated in battery module B and electric module 15, and may recover waste heat from a high-temperature coolant selectively introduced into it to exchange heat between the coolant and the refrigerant thereby raising the temperature of the refrigerant.

In the present example embodiment, air conditioning system 20 further includes a dehumidifying line 41, a defrosting line 43, and a second expansion valve 45.

One end of dehumidifying line 41 is connected to refrigerant line 21 between internal condenser 23 and external condenser 35. The other end of dehumidifying line 41 is connected to refrigerant line 21 between evaporator 27 and first expansion valve 37. A third valve V3 is disposed on dehumidifying line 41. Dehumidifying line 41 may be opened through operation of third valve V3 when the vehicle is in a heating and dehumidifying mode.

Defrosting line 43 is connected to refrigerant line 21 between external condenser 35 and first expansion valve 37 through a fourth valve V4 disposed on refrigerant line 21 between internal condenser 23 and external condenser 35. Defrosting line 43 may be selectively opened through operation of fourth valve V4 when the vehicle is in a heating and defrosting mode.

An orifice 39 may be disposed on refrigerant line 21 between internal condenser 23 and fourth valve V4.

Orifice 39 serves to expand the refrigerant exhausted from internal condenser 23. In addition, orifice 39 may function as a valve circulating the refrigerant without expanding the refrigerant selectively depending on whether the vehicle is in a cooling mode, a heating mode, or a heating and dehumidifying mode. Orifice 39 may selectively open or close refrigerant line 21 or selectively expand the refrigerant passing through it.

Dehumidifying line 41 may be connected to refrigerant line 21 between fourth valve V4 and orifice 39.

In addition, a second expansion valve 45 is disposed on first connection line 111 between external condenser 35 and first chiller 110. Second expansion valve 45 is operated when cooling battery module B using the refrigerant. Second expansion valve 45 may expand the refrigerant introduced through first connection line 111 and then introduce the refrigerant in a low-temperature state into first chiller 110.

Second expansion valve 45 expands the condensed refrigerant exhausted from external condenser 35 to lower the temperature of the condensed refrigerant and then introduces the refrigerant into first chiller 110, further lowering the temperature of the coolant passing through the first chiller 110.

The low-temperature coolant exiting the first chiller 100 is introduced into battery module B, such that battery module B may be more efficiently cooled.

In the present example embodiment, a fifth valve V5 disposed on second cooling line 11 selectively connects second cooling line 11 to first cooling line 101 between radiator 12 and battery module B.

In addition, the second cooling line 11 may include a second branch line 130 to connect radiator 12 with electric module 15 by operation of fifth valve V5 between electric module 15 and the first chiller 110.

Fifth valve V5 may close second branch line 130 when cooling battery module B using the coolant cooled in radiator 12.

Therefore, the coolant cooled in radiator 12 cools battery module B while flowing along first cooling line 101 connected to second cooling line 11 by operation of fifth valve V5.

In contrast, fifth valve V5 may close the connection between second cooling line 11 and first cooling line 101 and open second branch line 130, when cooling only electric module 15 using the coolant. That is, the coolant cooled in radiator 12 is introduced into electric module 15 through second branch line 130, thereby making it possible to rapidly cool electric module 15.

In addition, fifth valve V5 may open second branch line 130 and close the connection between second cooling line 11 and first cooling line 101, when cooling the battery module B using the coolant exchanging heat with the refrigerant or when raising the temperature of battery module B.

A reservoir tank 16 may be disposed on second cooling line 11 between radiator 12 and fifth valve V5. The coolant introduced into and cooled by radiator 12 may be stored in reservoir tank 16.

Reservoir tank 16 is connected to a third branch line 140 through a sixth valve V6 provided on second cooling line 11 between radiator 12 and electric module 15.

Second chiller 113 is disposed on third branch line 140, and is selectively connected to second cooling line 11 based on operation of sixth valve V6. Therefore, the coolant may be introduced into second chiller 113 through third branch line 140.

In addition, second connection lines 115 are connected to first connection lines 111.

In the present example embodiment, when the vehicle is in a heating mode and waste heat is being recovered from battery module B, third branch line 140 is open and second cooling line 11 connected to radiator 12 is closed by operation of sixth valve V6.

Reservoir tank 16 may be connected to first branch line 120 through a degassing line 150. Degassing line 150 may exhaust bubbles generated in the coolant passing through first branch line 120 to reservoir tank 16 or introduce bubbles generated and collected from the coolant circulated along second cooling line 11 into first branch line 120 in order to maintain the pressure balance between second cooling line 11 and first cooling line 101.

In addition, degassing line 150 may introduce some of the bubbles from the coolant passing through first branch line 120 into reservoir tank 16 to prevent generation of a pressure differential between second cooling line 11 and first branch line 120, when cooling battery module B using the coolant exchanging heat with the refrigerant, and when coolant is not circulated along second cooling line 11.

Although an example embodiment in which reservoir tank 16 is disposed on second cooling line 11 between radiator 12 and battery module B, and degassing line 150 is connected to first branch line 120 has been described, the present disclosure is not limited thereto. For example, in an alternative embodiment, reservoir tank 16 may be disposed on first cooling line 101 between radiator 12 and battery module B. In this case, degassing line 150 may be connected to second branch line 130.

In the present example embodiment, the first, second, fourth, fifth and sixth valves V1, V2, V4, V5, and V6 may be 3-way valves that may distribute a flow rate.

Hereinafter, operations and actions, in each mode, of an example embodiment of heat pump system 100 for a vehicle configured as described above are described in detail with reference to FIGS. 2 to 7.

First, operation of an example embodiment of heat pump system 100 for a vehicle when cooling a battery module using a coolant is described with reference to FIG. 2.

Figure 2:
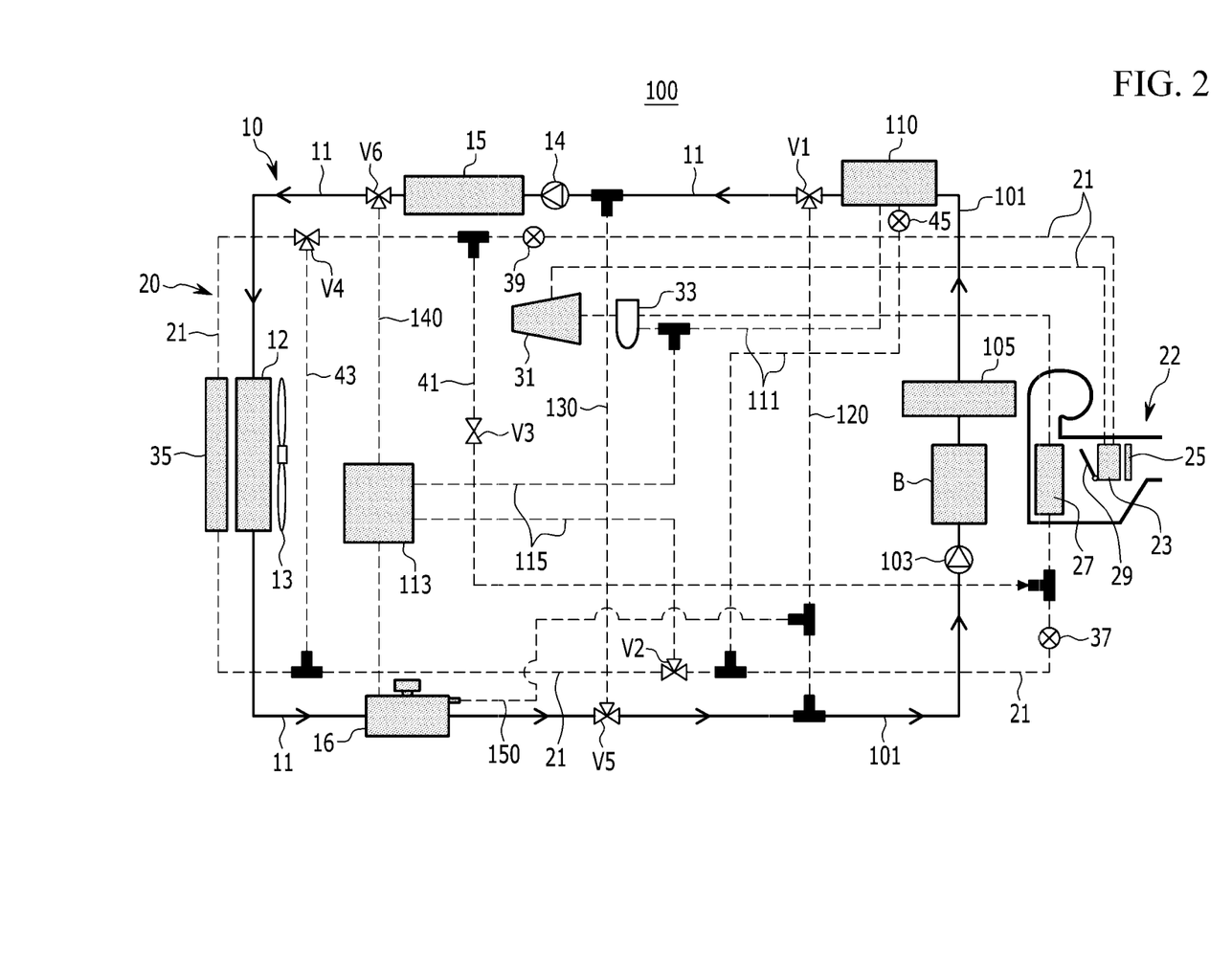
FIG. 2 is a block diagram showing operation of an example embodiment of a heat pump system for a vehicle when cooling a battery module using a coolant.

Referring to FIG. 2, the cooling system 10 is operated in order to cool electric module 15.

In this case, first valve V1 connects second cooling line 11 connected to radiator 12 to first cooling line 101 and closes first branch line 120.

Fifth valve V5 closes second branch line 130 and opens the connection between second cooling line 11 and first cooling line 101. Sixth valve V6 opens second cooling line 11 connecting radiator 12 to electric module 15, and closes third branch line 140.

In this case, first cooling line 101 and second cooling line 11 may be connected to each other by the first and fifth valves V1 and V5, and form one closed circuit through which the coolant is circulated.

Therefore, the coolant cooled in radiator 12 is circulated along second cooling line 11 and first cooling line 101 so as to sequentially cool battery module B and electric module 15 by operation of first and second pumps 14 and 103.

That is, the cooled coolant exhausted from radiator 12 is introduced into battery module B through first cooling line 101, and cools battery module B.

Next, the coolant passes through heater 105 and first chiller 110 (which are not activated), passes through electric module 15 through second cooling line 11, and is then again introduced into radiator 12.

Because the low-temperature coolant cooled in radiator 12 first cools battery module B, the battery module B may be efficiently cooled.

Meanwhile, air conditioning system 20 is not operated because the vehicle is not in a cooling mode.

Operation of an example embodiment of the heat pump system of a vehicle when cooling the battery module based on a cooling mode of the vehicle is described below with reference to FIG. 3.

Figure 3:
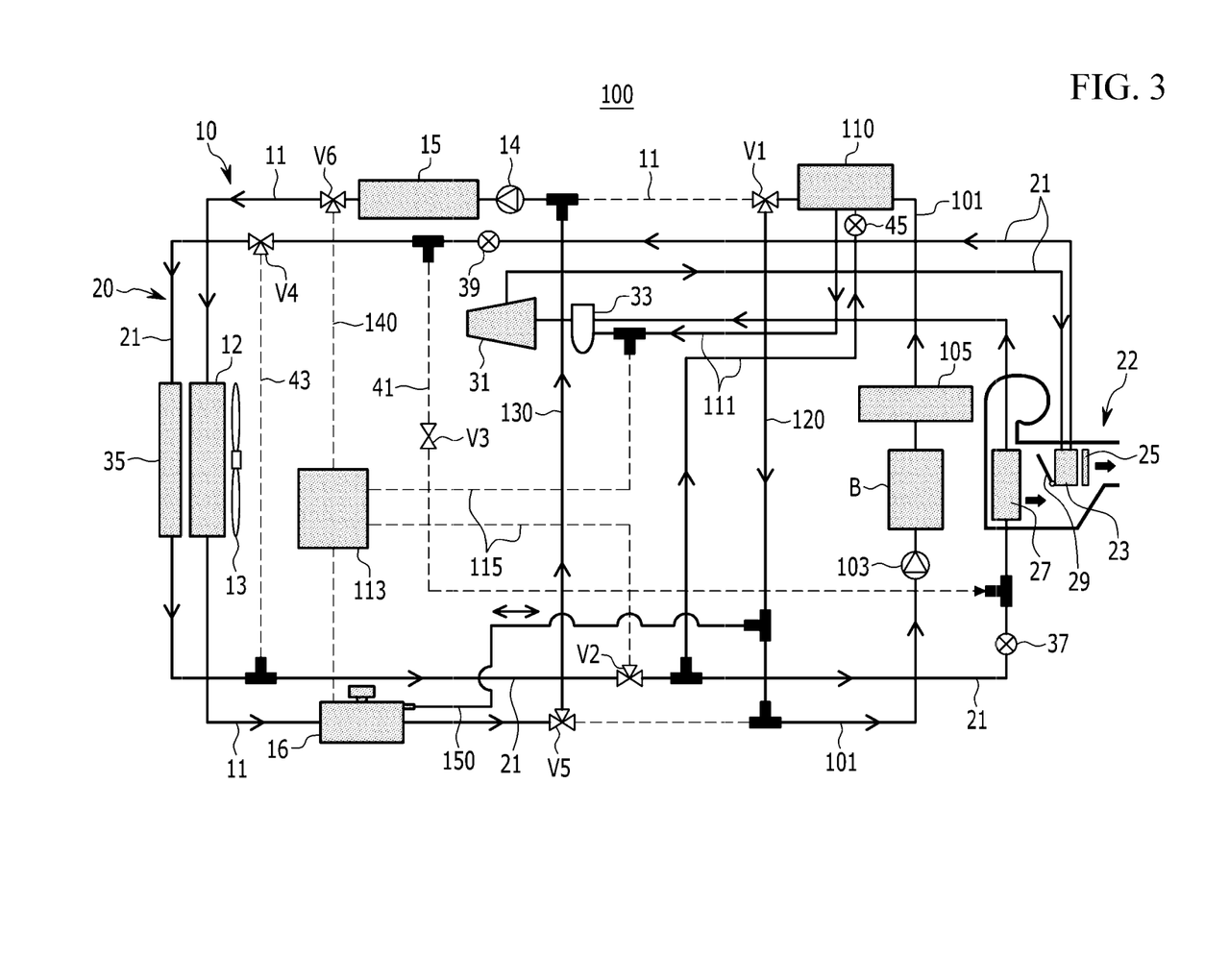
FIG. 3 is a block diagram showing operation of an example embodiment of a heat pump system for a vehicle when cooling an electric module and the battery module based on the cooling mode of the vehicle.

Referring to FIG. 3, cooling system 10 is operated in order to cool electric module 15.

In this case, first valve V1 opens first branch line 120, and closes the connection between second cooling line 11 and first cooling line 101. Fifth valve V5 closes the connection between second cooling line 11 and first cooling line 101, and opens second branch line 130.

In addition, sixth valve V6 closes third branch line 140, and opens second cooling line 11 connecting radiator 12 to electric module 15.

Therefore, second cooling line 11 of cooling system 10 and first cooling line 101 may form closed circuits through which the coolant is independently circulated through first and second branch lines 120 and 130, respectively.

That is, the coolant cooled in radiator 12 is circulated along second cooling line 11 and second branch line 130 so as to cool electric module 15 through operation of first pump 14.

In addition, the coolant passing through first chiller 110 is circulated along first cooling line 101 and first branch line 120 so as to cool battery module B through operation of second pump 103.

The coolant circulated along first cooling line 101 is cooled through heat-exchange with the refrigerant in first chiller 110 and is supplied to battery module B, thereby cooling battery module B.

Degassing line 150 may exhaust the bubbles generated in the coolant passing through first branch line 120 to reservoir tank 16 or introduce the bubbles generated and collected from coolant circulated along second cooling line 11 into first branch line 120 so as to maintain the pressure balance between second cooling line 11 and first cooling line 101.

Air conditioning system 20 circulates the refrigerant along the refrigerant line 21 so as to cool the interior of the vehicle.

Dehumidifying line 41 and defrosting line 43 are closed by operation of third and fourth valves V3 and V4.

In addition, second valve V2 connects refrigerant lines 21 to each other between external condenser 35 and evaporator 27, such that first connection line 111 is connected to refrigerant line 21.

Therefore, some of the refrigerant exhausted from external condenser 35 is introduced into first connection line 111, is expanded through operation of second expansion valve 45 into a low-temperature and low-pressure state, and is then introduced into first chiller 110 connected to first connection line 111.

Next, the refrigerant introduced into first chiller 110 exchanges heat with the coolant, and is then introduced into accumulator 33 through first connection line 111.

The coolant heated while cooling battery module B is cooled through heat-exchange with the low-temperature and low-pressure refrigerant in first chiller 110. The cooled coolant is again supplied to battery module B through first cooling line 101.

The coolant may efficiently cool the battery module B while repeatedly performing the operation as described above.

The refrigerant exhausted from external condenser 35 flows through refrigerant line 21 so as to cool the interior of the vehicle, and sequentially passes through first expansion valve 37, evaporator 27, accumulator 33, compressor 31, and internal condenser 23.

External air introduced into HVAC module 22 is cooled by the refrigerant introduced into evaporator 27.

Door 29 closes a portion of an opening through which the cooled external air may pass into internal condenser 23 so that cooled external air does not pass through internal condenser 23 and internal heater 25. The cooled external air is directly introduced into the interior of the vehicle, thereby cooling the interior of the vehicle.

Next, the refrigerant passes through orifice 39 and is then introduced into external condenser 35, and is condensed through heat-exchange with external air while passing through external condenser 35.

In this case, orifice 39 may be operated as a valve.

The refrigerant cools the coolant through heat-exchange while passing through first chiller 110, simultaneously cooling the interior of the vehicle while the vehicle is in a cooling mode of the vehicle by repeatedly performing the process described above.

In the present example embodiment, operation of an example heat pump system of a vehicle when cooling the battery module using the refrigerant when the cooling mode of the vehicle is stopped is described below with reference to FIG. 4.

Figure 4:
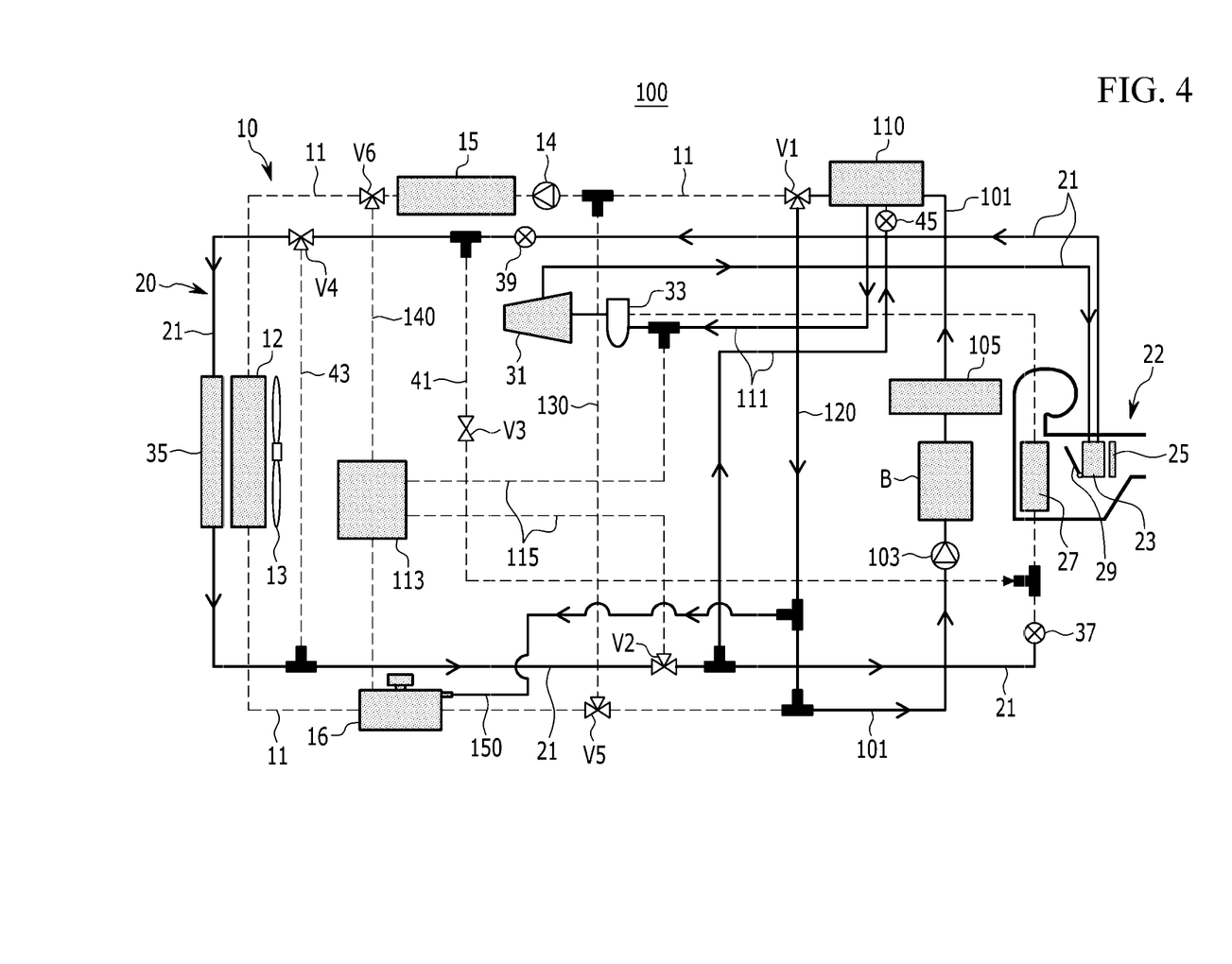
FIG. 4 is a block diagram showing operation of an example embodiment of a heat pump system for a vehicle state when cooling the battery module using a coolant while the vehicle cooling mode is stopped.

Referring to FIG. 4, when cooling battery module B using the refrigerant, operation of first expansion valve 37 of air conditioning system 20 is stopped, thereby preventing introduction of the refrigerant into evaporator 27.

The refrigerant is introduced from compressor 31 into external condenser 35 and is condensed through heat-exchange with external air. Next, the refrigerant is exhausted from external condenser 35, and second valve V2 connects refrigerant lines 21 to each other, such that the refrigerant is introduced into first connection line 111.

The refrigerant introduced into first connection line 111 is expanded through operation of second expansion valve 45 into a low-temperature and low-pressure state that passes through first chiller 110.

The refrigerant introduced into first chiller 110 exchanges heat with the coolant, and is then introduced into accumulator 33 through first connection line 111.

First valve V1 may open first branch line 120 and close the connection between second cooling line 11 and first cooling line 101.

In addition, fifth valve V5 may close second branch line 130 and the connection between second cooling line 11 and first cooling line 101.

The coolant heated while cooling battery module B is cooled through heat exchange with the low-temperature and low-pressure refrigerant in first chiller 110. The cooled coolant is again supplied to battery module B through first cooling line 101 and first branch line 120.

Therefore, the coolant cooled through heat exchange with the refrigerant in first chiller 110 is introduced into battery module B by operation of second pump 103.

Therefore, the coolant may efficiently cool battery module B while repeatedly performing the operation as described above.

Degassing line 150 introduces some of the bubbles in the coolant passing through first branch line 120 into reservoir tank 16 to prevent the generation of a pressure differential between second cooling line 11 and first branch line 120, when cooling battery module B using the coolant exchanging heat with the refrigerant, and when the coolant is not circulated along second cooling line 11.

The refrigerant passing through first chiller 110 passes through accumulator 33, and again sequentially passes through compressor 31 and internal condenser 23.

Next, the refrigerant passes through orifice 39 and is then introduced into external condenser 35 where it condensed through heat exchange with the external air while passing through external condenser 35.

Orifice 39 may be operated as a valve.

Dehumidifying line 41 and defrosting line 43 are closed by operation of third and fourth valves V3 and V4.

Cooling system 10 may be selectively operated depending on a cooling requirement of electric module 15, and the situation in which cooling system 10 is not operated is described by way of example in the present example embodiment.

However, when it is necessary to cool electric module 15, second cooling line 11 and second branch line 130 are opened by operation of the fifth valve V5 and sixth valve V6.

In this case, second cooling line 11 is not connected to first cooling line 101. Therefore, in each of cooling system 10 and battery module B, the coolant independently flows through closed circuits.

The coolant cooled in radiator 12 is circulated along second cooling line 11 to cool electric module 15 by operation of first pump 14.

In contrast, the coolant circulated along first cooling line 101 is cooled through heat exchange with the refrigerant in first chiller 110 and is supplied to battery module B by operation of second pump 103. Therefore, battery module B is efficiently cooled by the coolant cooled through heat exchange with the refrigerant.

In the present example embodiment, operation of an example embodiment of a heat pump system for a vehicle when recovering waste heat from the electric module and the battery module based on the heating mode of the vehicle is described with reference to FIG. 5.

Figure 5:
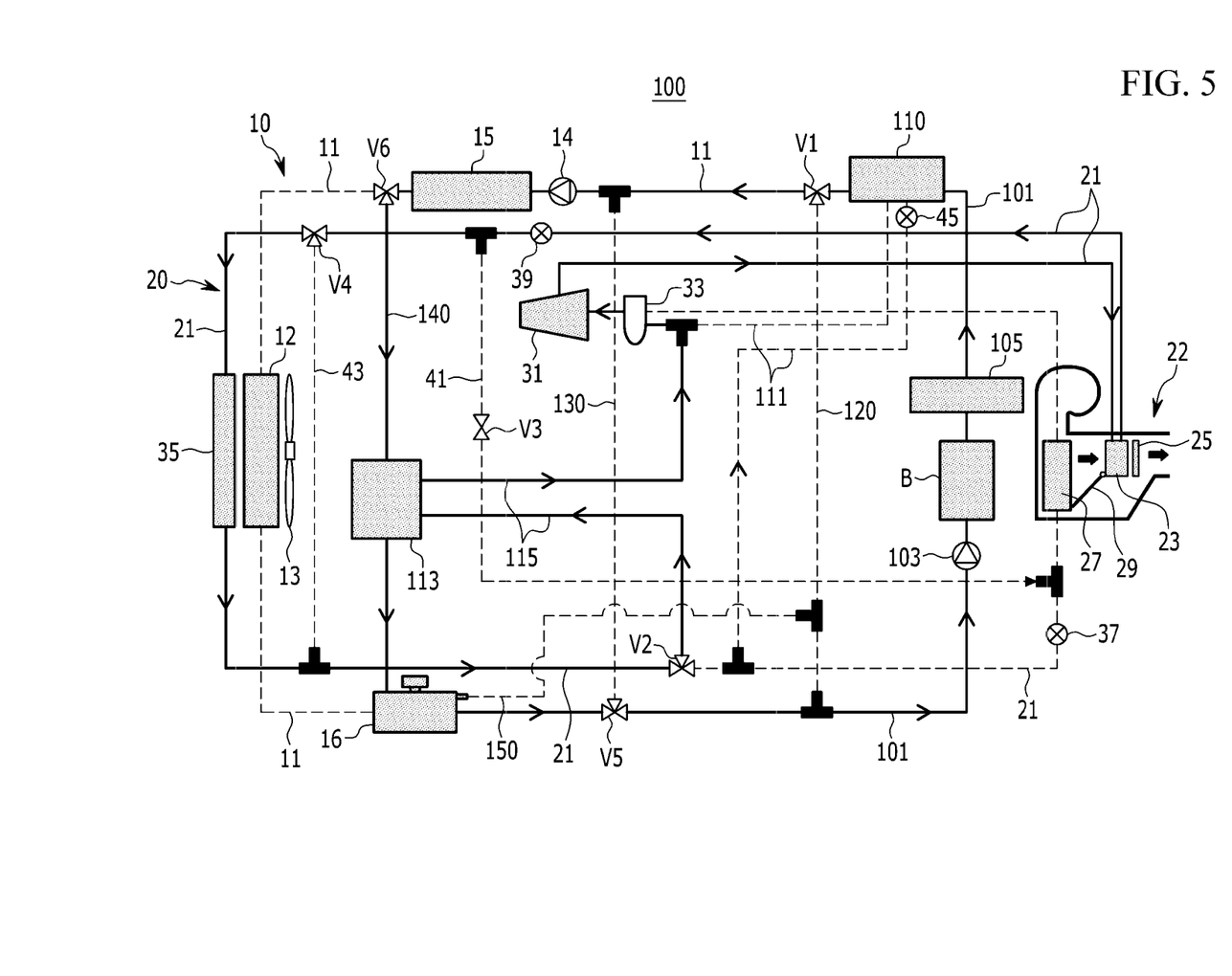
FIG. 5 is a block diagram showing operation of an example embodiment of a heat pump system for a vehicle when recovering waste heat from the electric module and the battery module when the vehicle is in a heating mode.

Referring to FIG. 5, when recovering waste heat from battery module B and electric module 15 when the vehicle is in a heating mode, first cooling line 101 and second cooling line 11 are connected to each other and first and second branch lines 120 and 130 are closed by operation of first and fifth valves V1 and V5.

Refrigerant line 21 connected to evaporator 27 is closed through operation of second valve V2, and second connection line 115 is opened. Therefore, refrigerant is introduced into second chiller 113 through second connection line 115.

In addition, dehumidifying line 41 and defrosting line 43 are closed by operation of third and fourth valves V3 and V4.

In this case, sixth valve V6 closes connection between cooling lines 11 so that electric module 15 is not connected to radiator 12, and at the same time, opens third branch line 140.

The coolant heated by the waste heat generated in electric module 15 and the waste heat generated in battery module B passes through second chiller 113 by operation of first and second pumps 14 and 103. Operation of first and second expansion valves 37 and 45 is stopped.

The refrigerant exhausted from external condenser 35 is introduced into second connection line 115 opened through operation of second valve V2. Next, the refrigerant is introduced into second chiller 113 through second connection line 115 where it exchanges heat with the heated coolant.

The waste heat generated in electric module 15 and battery module B thus raises the temperature of the refrigerant in second chiller 113.

The heated refrigerant passes through accumulator 33 through second connection line 115, and is then introduced into compressor 31. In addition, the refrigerant is compressed to a high-temperature and high-pressure state in compressor 31, and is then introduced into internal condenser 23.

Door 29 is opened so that the external air introduced into HVAC module 22 and passing through evaporator 27 passes through internal condenser 23.

The external air is introduced at ambient temperature into evaporator 27 to which the refrigerant is not supplied. The introduced external air is heated to a high temperature state while passing through internal condenser 23. The heated external air then passes through internal heater 25 that is selectively operated, and is then introduced into and heats the interior of the vehicle.

Next, after being expanded while passing through orifice 39, the refrigerant is introduced into external condenser 35 where it is condensed through heat exchange with the external air.

Orifice 39 may be operated as an expansion valve.

Heater 105 may be selectively activated, if necessary, to heat the coolant circulated along first cooling line 101. Therefore, as needed, the temperature of the refrigerant passing through second chiller 113 may be rapidly raised.

The example embodiment of a heat pump system 100 for a vehicle uses waste heat sources generated in electric module 15 and battery module B to raise the temperature of the refrigerant when the vehicle is in a heating mode, thereby making it possible to reduce power consumption by compressor 31 and improve heating efficiency.

When only recovering the waste heat generated in electric module 15, the connection between second cooling line 11 and first cooling line 101 is closed and second branch line 130 is opened by operation of fifth valve V5.

Second cooling line 11 is connected to second chiller 113 through second branch line 130 and third branch line 140. In this case, the temperature of the coolant passing through second cooling line 11 and second and third branch lines 130 and 140 is raised by the waste heat generated from electric module 15, and the heated coolant is introduced into second chiller 113.

Refrigerant is introduced into second chiller 113 through second connection line 115, where the temperature of the refrigerant is raised by heat exchange with the heated coolant.

The heated refrigerant passes through accumulator 33 through second connection line 115, and is then introduced into compressor 31. The refrigerant is compressed to a high-temperature and high-pressure state in compressor 31, and is then introduced into internal condenser 23.

Door 29 is opened so that the external air introduced into HVAC module 22 and passing through evaporator 27 passes through internal condenser 23.

The external air is introduced at ambient temperature into evaporator 27 to which the refrigerant is not supplied. The introduced external air is heated to a high temperature state in internal condenser 23. The heated external air passes through internal heater 25 that is selectively operated, and is then introduced into and heats the interior of the vehicle.

The example embodiment of a heat pump system 100 for a vehicle may selectively use the waste heat of battery module B and electric module 15 or only the waste heat of electric module 15 to heat the interior of the vehicle.

In the present example embodiment, operation of an example embodiment of a heat pump system 100 for a vehicle when recovering waste heat from the electric module and the battery module when the vehicle is in a heating and dehumidifying mode is described with reference to FIG. 6.

Figure 6:
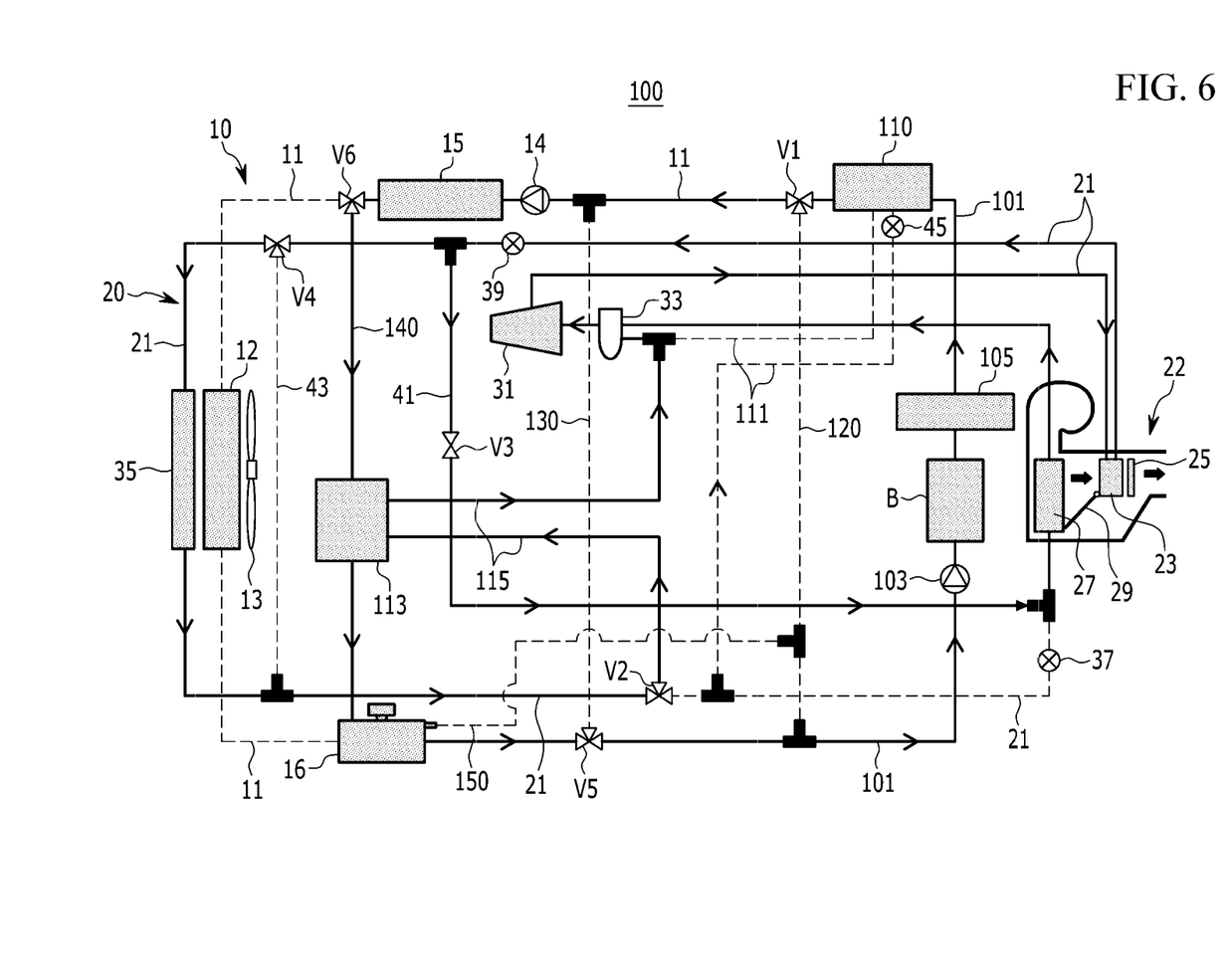
FIG. 6 is a block diagram showing operation of an example embodiment of a heat pump system for a vehicle when recovering waste heat from the electric module and the battery module while the vehicle is in a heating and dehumidifying mode.

Referring to FIG. 6, when recovering the waste heat of battery module B and electric module 15 when the vehicle is in a heating and dehumidifying mode, first cooling line 101 and second cooling line 11 are connected to each other and first and second branch lines 120 and 130 are closed by operation of first and fifth valves V1 and V5.

Refrigerant line 21 connected to evaporator 27 is closed by operation of second valve V2, and second connection line 115 is opened. Therefore, the refrigerant is introduced into second chiller 113 through second connection line 115.

In addition, dehumidifying line 41 is opened by operation of third valve V3, and defrosting line 43 is closed by operation of fourth valve V4.

In this case, sixth valve V6 closes the connection between cooling lines 11 so that electric module 15 is not connected to radiator 12, and, at the same time, opens third branch line 140.

The heated coolant passes through second chiller 113 by operation of first and second pumps 14 and 103. Operation of first and second expansion valves 37 and 45 is stopped.

Dehumidifying line 41 is opened by operation of third valve V3 so that some of the refrigerant introduced into external condenser 35 is circulated. In addition, defrosting line 43 is closed by operation of fourth valve V4.

The refrigerant exhausted from external condenser 35 is introduced into second connection line 115 opened by operation of second valve V2. Next, the refrigerant is introduced into second chiller 113 through second connection line 115, where it is heated by heat exchange with the heated coolant.

The waste heat generated in electric module 15 and battery module B thus raises the temperature of the refrigerant in second chiller 113.

The heated refrigerant passes through accumulator 33 through second connection line 115, and is then introduced into compressor 31. The refrigerant is compressed to a high-temperature and high-pressure state in compressor 31, and is then introduced into internal condenser 23.

Refrigerant line 121 connecting first expansion valve 37 to evaporator 27 is closed by operation of second valve V2. However, some of the refrigerant expanded while passing through orifice 39 is introduced into evaporator 27 through opened dehumidifying line 41.

Door 29 is opened so that the external air introduced into HVAC module 22 and passing through evaporator 27 passes through internal condenser 23.

The external air introduced into HVAC module 22 is dehumidified by the refrigerant introduced into evaporator 27 and is in a low-temperature state while passing through evaporator 27. The external air is heated to a high temperature state while passing through internal condenser 23. The heated external air passes through internal heater 25 that is selectively operated, and is then introduced into the and heats interior of the vehicle.

Next, after being expanded while passing through orifice 39, the refrigerant is introduced into external condenser 35 and is condensed by heat exchange with the external air passing through the external condenser 35.

Orifice 39 may be operated as an expansion valve.

An example embodiment of a heat pump system 100 for a vehicle uses waste heat sources generated in electric module 15 and battery module B to raise the temperature of the refrigerant when the vehicle is in a heating and dehumidifying mode, thereby making it possible to reduce power consumption by the compressor 31 and improve heating efficiency.

Some of the refrigerant expanded while passing through orifice 39 is introduced into evaporator 27 through dehumidifying line 41, thereby making it possible to dehumidify the interior without operating first expansion valve 37.

When recovering only the waste heat generated in electric module 15, the connection between second cooling line 11 and first cooling line 101 is closed and second branch line 130 is opened by operation of fifth valve V5.

Second cooling line 11 is connected to second chiller 113 through second branch line 130 and third branch line 140. In this case, the temperature of the coolant passing through second cooling line 11 and second and third branch lines 130 and 140 is raised by the waste heat generated in electric module 15, and the heated coolant is introduced into second chiller 113.

The refrigerant is introduced into second chiller 113 through second connection line 115, and the temperature of the refrigerant is raised as the refrigerant exchanges heat with the heated.

The heated refrigerant passes through the accumulator 33 through second connection line 115, and is then introduced into compressor 31. The refrigerant is compressed to a high-temperature and high-pressure state in compressor 31, and is introduced into internal condenser 23.

Door 29 is opened so that the external air introduced into HVAC module 22 and passing through evaporator 27 passes through internal condenser 23.

The external air introduced into HVAC module 22 is dehumidified by the refrigerant introduced into evaporator 27 and is in a low-temperature state while passing through evaporator 27. The external air is heated to a high temperature state while passing through internal condenser 23. The heated external air, passes through internal heater 25 that is selectively operated, and is then introduced into and heats and dehumidifies the interior of the vehicle.

An example embodiment of the heat pump system 100 for a vehicle may selectively use the waste heat of the battery module B and the electric module 15 or only the waste heat of the electric module 15 to dehumidify the interior of the vehicle while heating the interior of the vehicle.

In another present example embodiment, operation of an example embodiment of the heat pump system 100 for a vehicle when recovering waste heat from the electric module and the battery module when the vehicle is in a heating and defrosting mode is described with reference to FIG. 7.

The defrosting mode is used when frost is generated in external condenser 35.

Figure 7:
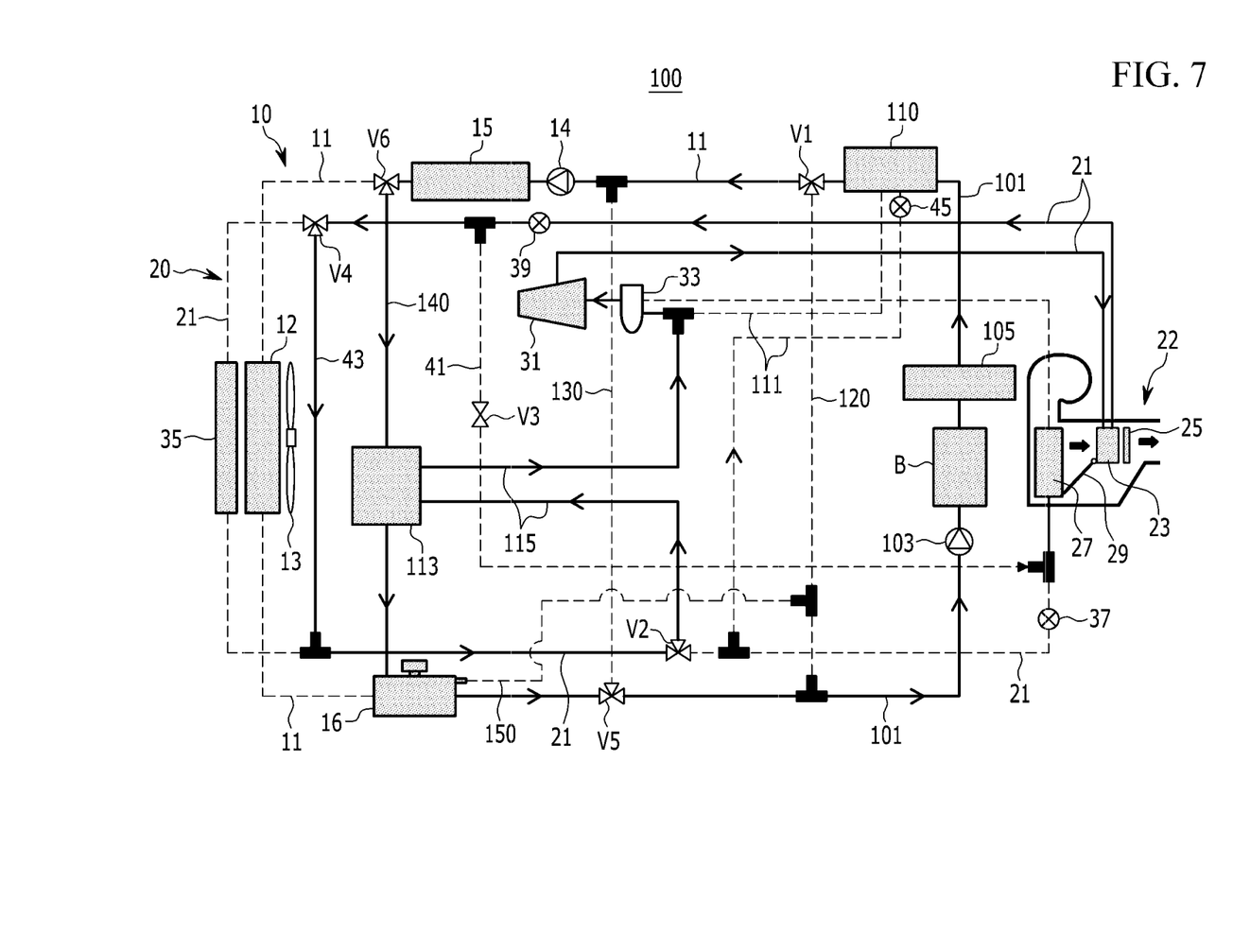
FIG. 7 is a block diagram showing operation of an example embodiment of a heat pump system for a vehicle when recovering waste heat from the electric module and the battery module while the vehicle is in a heating and defrosting mode.

Referring to FIG. 7, when recovering the waste heat of battery module B and electric module 15 while the vehicle is in a heating and defrosting mode, first cooling line 101 and second cooling line 11 are connected to each other, and first and second branch lines 120 and 130 are closed by operation of first and fifth valves V1 and V5.

Refrigerant line 21 connected to evaporator 27 is closed by operation of second valve V2, and second connection line 115 is opened. Therefore, the refrigerant is introduced into second chiller 113 through second connection line 115.

In addition, refrigerant lines 21 connected to external condenser 35 and dehumidifying line 41 are closed by operation of third and fourth valves V3 and V4.

Defrosting line 43 is opened by operation of fourth valve V4.

In this case, sixth valve V6 closes the connection between cooling lines 11 so that electric module 15 is not connected to radiator 12, and at the same time, opens third branch line 140.

At the same time, second cooling line 11 passing through electric module 15 and first cooling line 101 are connected to each other by operation of first, fifth, and sixth valves V1, V5, and V6.

Therefore, the heated coolant passes through second chiller 113 by operation of first and second pumps 14 and 103.

Defrosting line 43 stops introducing the refrigerant into external condenser 35 and introduces the refrigerant into second chiller 113 through second connection line 115, thereby making it possible to defrost while simultaneously preventing an increase in the frost in external condenser 35.

In this case, operation of first and second expansion valves 37 and 45 is stopped.

The refrigerant passing through orifice 39 is introduced into second connection line 115 opened by operation of second valve V2 without passing through external condenser 35. Next, the refrigerant is introduced into second chiller 113 through second connection line 115, where it exchanges heat with the heated coolant.

The waste heat generated in electric module 15 and battery module B thus raises the temperature of the refrigerant in second chiller 113.

The heated refrigerant passes through accumulator 33, is introduced into compressor 31, is compressed to a high-temperature and high-pressure state in compressor 31, and is then introduced into internal condenser 23.

Refrigerant line 21 connecting first expansion valve 37 to evaporator 27 is closed by operation of second valve V2.

Door 29 is opened so that the external air introduced into HVAC module 22 and passing through evaporator 27 passes through internal condenser 23.

Therefore, the external air is introduced at ambient temperature into evaporator 27 to which the refrigerant is not supplied. The introduced external air is heated to a high temperature state while passing through internal condenser 23. The heated external air passes through internal heater 25 that is selectively operated, and is then introduced into and heats the interior of the vehicle.

The refrigerant is expanded while passing through orifice 39, and is circulated while being again introduced into defrosting line 43.

Orifice 39 may be operated as an expansion valve.

Heater 105 may be selectively activated, if necessary, to heat the coolant circulated along first cooling line 101. Therefore, the temperature of the refrigerant passing through second chiller 113 may be rapidly raised.

An example embodiment of a heat pump system 100 for a vehicle uses waste heat sources generated in electric module 15 and battery module B to raise the temperature of the refrigerant when the vehicle is in a heating and defrosting mode, thereby making it possible to reduce power consumption by compressor 31 and improve heating efficiency.

In addition, when frost is generated in external condenser 35, the introduction of the refrigerant is blocked through defrosting line 43, thereby making it possible to more rapidly defrost external condenser 35.

Although a scenario where both the waste heat of electric module 15 and the waste heat of battery module B are recovered when the vehicle is in a heating has been described by way of example, the present invention is not limited thereto. in further example embodiments, only the waste heat generated in electric module 15 also may be recovered when the vehicle is in a heating mode or a heating and dehumidifying mode.

In addition, when raising the temperature of battery module B, heater 105 may be activated at the time of raising the temperature of the battery module B to heat the coolant circulated along first cooling line 101 and introduce the heated coolant into battery module B.

Therefore, when an example embodiment of a heat pump system 100 for a vehicle configured as described above is used, the temperature of battery module B is raised or battery module B is cooled depending on the modes of the vehicle using first chiller 110 where the coolant and the refrigerant exchange heat with each other in the electric vehicle or the hybrid vehicle, thereby making it possible to simplify the heat pump system for a vehicle.

In addition, the temperature of battery module B is efficiently raised or cooled depending on the modes of the vehicle, such that battery module B may exhibit optimal performance, and the maximum travel distance of the vehicle may be increased by efficient management of battery module B.

In addition, the heat pump system 100 for a vehicle according to an example embodiment may improve the heating efficiency using second chiller 113 to selectively recover the waste heat of electric module 15 and battery module B.

Furthermore, the entire heat pump system for a vehicle is simplified, thereby making it possible to reduce manufacturing costs for the vehicle and the weight of the heat pump system, while also improving space utilization.

While this disclosure describes practical example embodiments, it is to be understood that the invention is not limited to the disclosed embodiments, but, on the contrary, is intended to cover various modifications and equivalent arrangements included within the spirit and scope of the appended claims.

What is claimed is:

1. A heat pump system for a vehicle having a battery module and an electric module, the heat pump system comprising:
   a first cooling line connected to the battery module and having a first coolant flowing therein;
   a cooling system comprising a radiator connected to a second cooling line and a first pump, wherein the first pump is connected to the first cooling line through a first valve;
   a first chiller disposed on the first cooling line, connected to a refrigerant line of an air conditioning system through a first connection line; and
   a second chiller connected to the first cooling line and connected to a second connection line through a second valve disposed on the refrigerant line,
   wherein the cooling system circulates the coolant along the second cooling line in order to cool the electric module;
   the first chiller exchanges heat between a second coolant selectively introduced thereinto and a refrigerant to control a temperature of the coolant; and
   the second chiller recovers waste heat from the coolant selectively introduced thereinto to raise a temperature of the refrigerant by exchanging heat between the coolant and the refrigerant;
   wherein the air conditioning system includes:
   a heating, ventilation, and air conditioning module connected through the refrigerant line, and including a door controlling external air passing through an evaporator;
   a compressor connected between the evaporator and the internal condenser through the refrigerant line;
   an accumulator disposed on the refrigerant line between the compressor and the evaporator;
   an external condenser connected to the internal condenser through the refrigerant line;
   a first expansion valve disposed on the refrigerant line connecting the external condenser and the evaporator to each other;
   a dehumidifying line having one end connected to the refrigerant line between the internal condenser and the external condenser and the other end connected to the refrigerant line between the evaporator and the first expansion valve and including a third valve;
   a defrosting valve connected to the refrigerant line between the external condenser and the first expansion valve through a fourth valve disposed on the refrigerant line between the internal condenser and the external condenser; and
   a second expansion valve provided on the first connection line;
   wherein the door selectively introduces the external air into an internal condenser and an internal heater depending on whether the vehicle is in a cooling mode, a heating mode, or a heating and dehumidifying mode; and
   the first valve connects the second cooling line connected to the electric module to the first cooling line between the radiator and the first chiller;
   a first branch line connecting the first chiller to the battery module through the first valve is disposed on the first cooling line;
   a fifth valve selectively connecting the second cooling line to the first cooling line between the radiator and the battery module is disposed on the second cooling line, and
   a second branch line connecting the radiator to the electric module through the fifth valve is disposed on the second cooling line connecting the electric module to the first valve; and
   wherein, when cooling the battery module using a coolant cooled in the radiator, the first valve and the fifth valve connect the second cooling line to the first cooling line and close the first and second branch lines.

2. The heat pump system for a vehicle of claim 1, wherein, when cooling the battery module using the refrigerant, the second expansion valve is operated, expands the refrigerant introduced through the first connection line, and introduces the expanded refrigerant into the first chiller.

3. The heat pump system for a vehicle of claim 1, wherein, when raising a temperature of the battery module or when cooling the battery module using the coolant exchanging heat with the refrigerant:
   the first valve opens the first branch line and closes the connection between the second cooling line and the first cooling line, and
   the fifth valve closes the connection between the second cooling line and the first cooling line simultaneously with closing the second branch line.

4. The heat pump system for a vehicle of claim 1, wherein, when cooling the battery module when the vehicle is in a cooling mode, the dehumidifying line and the defrosting line are closed by operation of third valve and the fourth valve.

5. The heat pump system for a vehicle of claim 1, wherein, when cooling the battery module using the refrigerant when the vehicle cooling mode is not operated:
   the dehumidifying line and the defrosting line are closed by operation of third valve and the fourth valve,
   operation of first expansion valve is stopped,
   and the second expansion valve is operated.

6. The heat pump system for a vehicle of claim 1, further comprising a reservoir tank disposed on the second cooling line between the radiator and the fifth valve, wherein the reservoir tank is connected to a third branch line through a sixth valve disposed on the second cooling line between the radiator and the electric module and is connected to the first branch line through a degassing line.

7. The heat pump system for a vehicle of claim 6, wherein:
   the second chiller is disposed on the third branch line and is selectively connected to the second cooling line based on an operation of sixth valve, and
   the second connection line is connected to the first connection line.

8. The heat pump system for a vehicle of claim 6, wherein, when recovering waste heat of the battery module and the electric module when the vehicle is in a heating mode:
   the first cooling line and the second cooling line are connected to each other, and the first branch line and the second branch line are closed, by operation of first valve and the fifth valve;
   the refrigerant line connected to the evaporator is closed and the second connection line is opened, by operation of second valve;
   the dehumidifying line and the defrosting line are closed by operation of third valve and the fourth valve,
   the third branch line is opened while the second cooling line connected to the radiator is closed by operation of sixth valve, and
   operation of the first and second expansion valves is stopped.

9. The heat pump system for a vehicle of claim 6, wherein, when recovering waste heat of the battery module and the electric module when the vehicle is in a heating and dehumidifying mode:
  the first cooling line and the second cooling line are connected to each other and the first branch line and the second branch line are closed, by operation of first valve and the fifth valve,
  the refrigerant line connected to the evaporator is closed and the second connection line is opened, by operation of second valve,
  the dehumidifying line is opened by operation of third valve;
  the defrosting line is closed by operation of fourth valve;
  the third branch line is opened while the second cooling line connected to the radiator is closed by operation of sixth valve, and
  operation of the first and second expansion valves is stopped.

10. The heat pump system for a vehicle of claim 6, wherein when recovering waste heat of the battery module and the electric module when the vehicle is in a heating and defrosting mode:
  the first cooling line and the second cooling line are connected to each other and the first branch line and the second branch line are closed, by operation of first valve and the fifth valve;
  the refrigerant line connected to the evaporator is closed and the second connection line is opened, by operation of second valve;
  the dehumidifying line is closed by operation of third valve and the defrosting line is opened by operation of fourth valve;
  the refrigerant line connected to the external condenser is closed by operation of fourth valve;
  the third branch line is opened while the second cooling line connected to the radiator is closed by operation of sixth valve, and
  operation of the first and second expansion valves is stopped.

11. The heat pump system for a vehicle of claim 6, wherein the degassing line exhausts bubbles generated in a coolant passing through the first branch line to the reservoir tank or introduces bubbles generated and collected from a coolant circulated along the second cooling line into the first branch line so as to maintain a pressure balance between the second cooling line and the first cooling line.

12. The heat pump system for a vehicle of claim 6, wherein, when cooling the battery module using the coolant exchanging heat with the refrigerant, and when coolant is not circulated along the second cooling line, the degassing line introduces bubbles included in a coolant passing through the first branch line into the reservoir tank to prevent generation of a pressure differential between the second cooling line and the first branch line.

13. The heat pump system for a vehicle of claim 6, wherein the first, second, fourth, fifth and sixth valves are 3-way valves.

14. The heat pump system for a vehicle of claim 1, further comprising an orifice disposed on the refrigerant line between the internal condenser and the fourth valve, wherein the orifice selectively opens or closes the refrigerant line or selectively expands a refrigerant passing therethrough.

15. The heat pump system for a vehicle of claim 14, wherein the dehumidifying line is connected to the refrigerant line between the fourth valve and the orifice.

16. The heat pump system for a vehicle of claim 1, further comprising:
  a second pump disposed on the first cooling line between the first chiller and the battery module.

17. The heat pump system for a vehicle of claim 1, further comprising:
  a heater disposed on the first cooling line between the battery module and the first chiller,
  wherein the heater is activated when raising a temperature of the battery module to heat the coolant circulated along the first cooling line, and
  wherein the heater is selectively activated when the vehicle is in a heating mode or a heating and defrosting mode of the vehicle to heat the coolant circulated along the first cooling line.

* * * * *